United States Patent [19]
Fujisaki et al.

[11] Patent Number: 5,170,449
[45] Date of Patent: Dec. 8, 1992

[54] CONVERTING DEVICE USING AN OPTICAL FIBER

[75] Inventors: Akira Fujisaki; Shintaro Sentsui, both of Ichihara, Japan

[73] Assignee: The Furukawa Electric Co., Ltd., Tokyo, Japan

[21] Appl. No.: 874,529

[22] Filed: Apr. 27, 1992

[51] Int. Cl.[5] .............................. G02B 6/28
[52] U.S. Cl. ................................ 385/32; 385/31; 385/24; 379/56
[58] Field of Search .................. 385/32, 31, 24, 7, 4, 385/28, 104, 118; 379/34, 35, 56; 359/328; 250/227.16

[56] References Cited

U.S. PATENT DOCUMENTS

| | | | |
|---|---|---|---|
| 4,684,215 | 8/1987 | Shaw et al. | 385/4 |
| 4,792,207 | 12/1988 | Shaw et al. | 385/28 |
| 4,824,205 | 4/1989 | Yamashita et al. | 385/104 |
| 4,961,620 | 10/1990 | Uken et al. | 385/32 |

Primary Examiner—John D. Lee
Assistant Examiner—Phan T. Heartney
Attorney, Agent, or Firm—Frishauf, Holtz, Goodman & Woodward

[57] ABSTRACT

A optical talk set has a talk set including bending means for bending an optical fiber of an optical cable, vibration applying means for applying vibration to the optical fiber, and a light-receiving element for receiving light leaking upon bending of the optical fiber and for converting the light into electricity, a signal transmitting-/receiving line having an input/output terminal, for enabling transmission of signals to be input to the bending means and the vibration applying means and a signal output from the light-receiving element, and a housing enclosing the converter, the signal transmitting/receiving line, and the light-receiving element. The input/output terminal of the signal transmitting/receiving line is provided so as to be exposed to the outside of the housing, by virtue of which a call can be made without opening the housing, facilitating maintenance, etc. of an optical fiber path.

5 Claims, 2 Drawing Sheets

CONVERTING DEVICE USING AN OPTICAL FIBER

BACKGROUND OF THE INVENTION

1. Field of the Invention

The present invention relates to a converting device for allowing an unused optical fiber in an optical cable to be utilized as a communication line when connection, laying, maintenance, etc. of an optical communication line such as an optical cable are performed.

2. Description of the Related Art

When connection, laying, maintenance, etc. of an optical cable for optical communication are performed, a person at an optical cable connection point (hereinafter referred to as a connection point) and a person in a terminal office, or persons at a plurality of connection points, must be in contact with each other. Conventionally, they stay in contact by using transceiver or telephones utilizing, for example, an intervening metal line or unused optical fiber within the optical cable, especially in a place where radio waves cannot be received/transmitted, such as a tunnel or the like. When the optical cable is of non-metal structure, i.e. one which does not include a twist pair, an unused optical fiber within the optical cable can be utilized for calls. Using a optical talk set, a call signal can be supplied to the optical fiber, thus enabling calls to be made (talking set using end to end optical fiber).

However, in order to connect the optical talk set to the optical fiber, it is necessary to extract a junction of the optical fiber from the housing in which the junction is enclosed. The optical fiber is then cut, and the sheath near the cut portions is removed. After a call is finished, the cut portions are reconnected to each other, and the junction is placed back in the housing to restore the optical fiber to its normal state. These operations, performed before and after a call, are troublesome and time-consuming.

In light of the above, the inventors first devised a clop on calling method for enabling calls to be made without the need to cut the optical fiber. According to this method, a piezoelectric element is provided on the transmission side of the optical fiber in which polarized light is transmitted. Using the piezoelectric element, vibration is externally applied to the optical fiber, thus modulating the plane of the polarized wave of the polarized light. On the receiving side of the optical fiber, a light signal whose the plane of the polarized wave has been modulated is extracted by local detection, thus enabling normal calls to be made. Thus, using this method, operations such as cutting the optical fiber and reconnecting the cut portions are unnecessary, since the piezoelectric element needs only to be placed in pressure contact with the optical fiber after the junction of the optical fiber is extracted from the housing.

However, like the previous method, the above method also entails an operation of extracting the junction of the optical fiber from the housing. Since it is hermetically sealed by a sealing member in order to prevent the housing from inundating with water, it is quite difficult to open the housing. While opening the housing is unavoidable in the case of work involving a connecting operation, such as when the optical cable is moved from one place to another or when a branch line of the cable is formed, opening the housing merely for the purpose of making a call is not practical.

SUMMARY

It is the object of the present invention to provide an optical talk set for enabling a call to be made without having to open the housing in which a junction of the optical communication cable is enclosed, and without having to cut the optical fiber.

The above object can be attained by means of an optical talk set which uses an optical fiber and has a talk set including bending means for bending an optical fiber of an optical cable, vibration applying means for applying vibration to the optical fiber, and a light-receiving element for receiving light leaking upon bending of the optical fiber and for converting the light into electricity; a signal transmitting/receiving line having an input-/output terminal, for enabling transmission of signals to be input to the bending means and the vibration applying means and a signal output from the light-receiving element; and a housing which encloses the converter, the signal transmitting/receiving line, and the optical cable. According to this converting device, the input-/output terminal of the signal transmitting/receiving line is arranged such that it is exposed to the outside of the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described in detail, with reference to the drawings.

Figure 1:
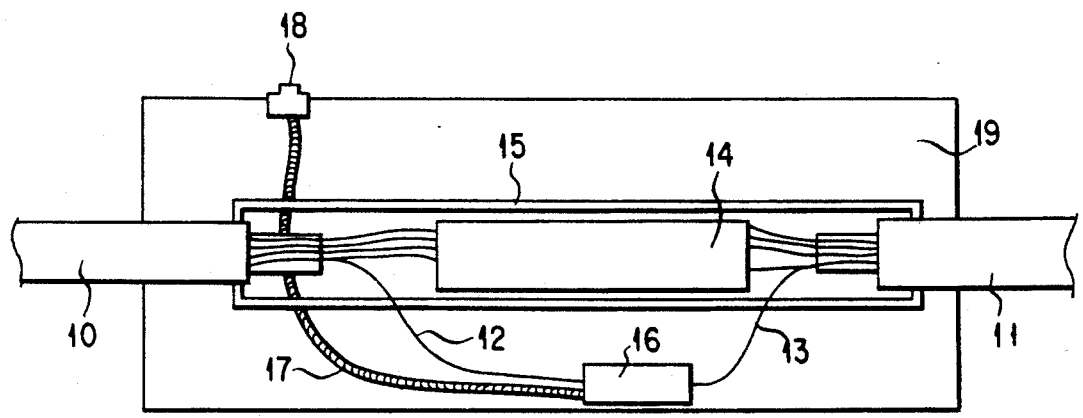
FIG. 1 is a diagram showing a schematic view of the optical talk set according to an embodiment of the present invention.

FIG. 1 is a diagram showing a schematic view of the optical talk set according to an embodiment of the present invention. In this drawing, reference numeral 10 denotes an optical cable including a plurality of optical fibers 12, and reference numeral 11 denotes an optical cable including a plurality of optical fibers 13. The optical fibers 12 and 13 are optically connected to one another at a junction 14. The optical cables 10 and 11 are held stationary by a supporting member 15. A talk set 16 is coupled to (an unused) one of the optical fibers. A signal transmitting/receiving line 17 is connected to the talk set 16, and a communication terminal 18 of the line 17 is attached to a housing 19 such that it is exposed to the outside thereof. The signal transmitting/receiving line 17 is used to allow a signal to be transmitted between the talk set 16 and an external device, or to connect the talk set 16 and an external power source to each other. The communication terminal 18 includes connecting terminals of the elements used when a call is made; e.g. input/output terminals and power source terminals of a light-receiving element, an preamplifier, etc.

Figure 2:
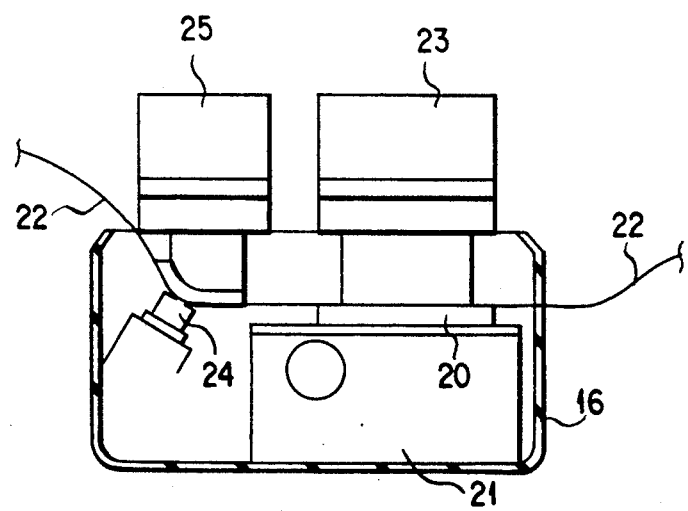
FIGS. 2 to 4 are diagrams showing schematic views of talk set in the optical talk set of present invention.
Figure 3:
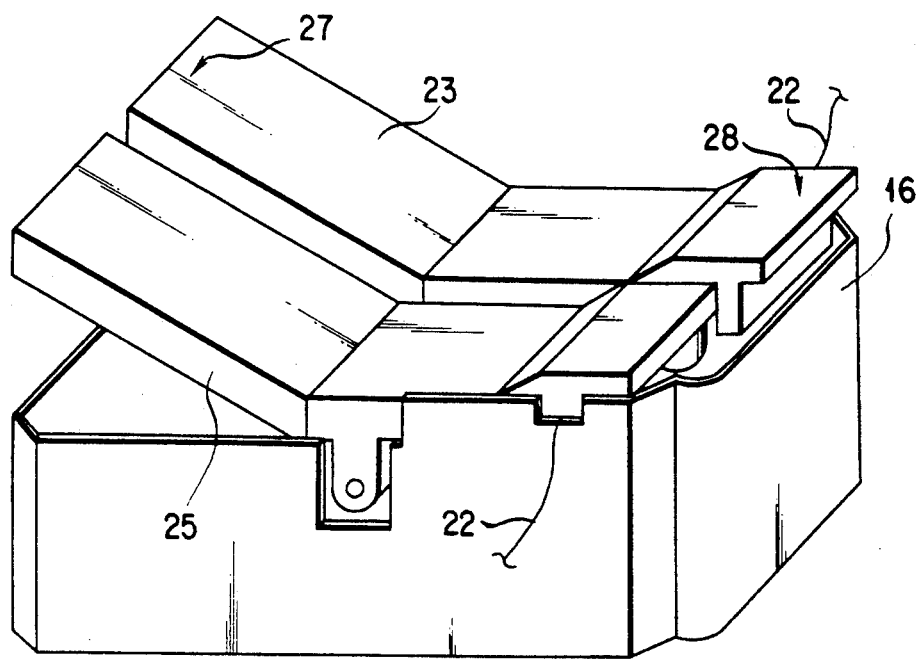
Figure 4:
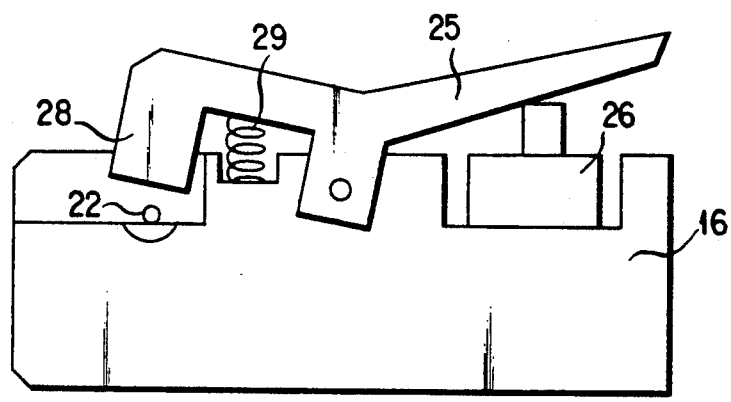

FIGS. 2 to 4 are diagrams showing schematic views of the talk set 16. In FIG. 2, reference numeral 20 denotes a piezoelectric element which mechanically vibrates in its thickness direction upon application of a voltage (i.e. ultrasonic vibration). The piezoelectric element 20 is mounted on a base 21 provided within the talk set 16, and an optical fiber 22 is in pressure contact with its upper surface. The element 20 is driven by a frequency-modulated wave whose carrier frequency is 1 MHz, for example. The mechanical resonance frequency in this case is 1 MHz (the carrier frequency is set at the same value as the mechanical resonance frequency). The optical fiber 22 is in pressure contact with the piezoelectric element 20 by a spring (not shown) of a pressing jig 23. The pressure applied by the spring is preferably about 1 kg, for example, so as not to damage the optical fiber 22. Transmission loss due to the pressure contact of the optical fiber 22 is zero. The plane of polarized wave of the polarized light transmitted to that portion of the optical fiber 22 which is in pressure contact with the piezoelectric element 20 is modulated by the ultrasonic vibration thereof.

A light-receiving element 24 such as a photodiode is attached to the optical fiber 22 in order to receive light leaking upon local detection and to convert it to electricity. A preamplifier (not shown) is provided in order to amplify the electric signal obtained as a result of the light-to-electricity conversion by the light-receiving element 24. This preamplifier is arranged within the talk set 16 to avoid the influences of noise, etc. as much as possible.

The optical fiber 22 is bent using an arm 25, as a result of which local detection occurs such that the modulated light as transmitted leaks to the outside of the optical fiber. However, since transmission loss occurs when the optical fiber 22 is bent as above, and since the amount of transmission loss increases in accordance with the number of bends formed, therefore the optical fiber should not be left bent after a call is finished. In view of this, a solenoid is used as a bending jig 26, as shown in FIG. 4. When an electric signal is supplied to the solenoid at the time a call is to be made, a rear portion 27 of the arm 25 is pushed upward, whereby a head portion 28 of the arm 25 is moved downward. The head portion 28 comes into pressure contact with the optical fiber 22, thus bending it as shown in FIG. 2. When a call is finished, supply of the electric signal to the solenoid ceases, with the result that the arm 25 is moved downward by a spring 29, as shown in FIG. 4, thus releasing the optical fiber 22 from the bending force.

The amount of transmission loss occurring due to bending of the optical fiber differs according to the wavelength of the light used. In general, the greater the wavelength, the larger the amount of light leakage. This being so, it is preferable that the light input to a quartz-series optical fiber have a wavelength on the order of 1.55 μm, since light having such a wavelength is transmitted with little transmission loss (about 1.5 dB).

In the optical talk set of the present invention, the communication terminal 18 includes input/output terminals and power source terminals of the elements provided in the talk set 16, such as, for example, the piezoelectric element 20 for modulating the plane of the polarized wave of the polarized light transmitted in the optical fiber 22, the solenoid used to bend the optical fiber 22, and the light-receiving element 24 for receiving modulated light is arranged so as to be exposed to the outside of the housing 19. By supplying power to the talk set 16 via the communication terminal 18, transmission/receipt of a call signal can be performed without having to open the housing 19. To be specific, a driving voltage is applied through the communication terminal 18 to the piezoelectric element 20, in response to which the element 20 vibrates. The optical fiber 22 is brought into pressure contact with the piezoelectric element 20, as a result of which the plane of the polarized wave of the polarized light within the optical fiber 22 is modulated such that a call signal is produced. An electric signal is supplied through the communication terminal 18 to the solenoid, with the result that the optical fiber 22 is bent, allowing the modulated light transmitted to leak to the outside of the optical fiber.

Thus, using the communication terminal 18, all of the operations involved in the clop on calling method can be performed. The polarized light whose of the polarized wave plane has been modulated can be extracted by bending the optical fiber 22 such that local detection occurs, and therefore it is not necessary to cut the fiber 22 in order to make a call.

According to the optical talk set of the present invention, as explained above, the communication terminal is provided outside the housing. Using the communication terminal, a call can be made without having to open the housing, thus facilitating maintenance, etc. of the optical fiber path. Further, according to the present invention, a voltage is applied to the piezoelectric element, in response to which it vibrates, modulating the plane of the polarized wave of the polarized light transmitted in the optical fiber. Therefore, a call can be made without having to cut the optical fiber. Moreover, according to the present invention, the optical fiber is kept bent only while a call is being made. Since transmission loss does not occur at any other time, transmission efficiency is therefore high. The structure of the talk set is simple, and the manufacturing cost thereof is low. Consequently, even if a plurality of converters are arranged on a plurality of optical fiber connection points, this will not significantly influence the running cost of the entire communication system.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical talk set using an optical fiber and comprising:

a talk set including bending means for bending an optical fiber of an optical cable, vibration applying means for applying vibration to the optical fiber, and a converter including a light-receiving element for receiving light leaking upon bending of the optical fiber and for converting the light into electricity;

a signal transmitting/receiving line having an input/output terminal, for enabling transmission of signals to be input to the bending means and the vibration applying means and a signal output from the light-receiving element; and a housing enclosing the converter, the signal transmitting/receiving line, and the optical cable;

wherein the input/output terminal of the signal transmitting/receiving line is provided so as to be exposed to the outside of the housing.

2. The optical talk set according to claim 1, wherein the vibration applying means is a piezoelectric element.

3. The optical talk set according to claim 1, wherein the vibration applying means is mechanically in pressure contact with the optical fiber.

4. The optical talk set according to claim 1, wherein the bending means is controlled to keep the optical fiber bent only while a call is being made, so as to cause light leakage.

5. The optical talk set according to claim 4, wherein a solenoid is used to control the bending means.

* * * * *